Nov. 10, 1970  J. C. LOCHRIDGE ETAL  3,538,712
METHOD AND APPARATUS FOR CONNECTING A RIGID RAMP USED FOR
PIPELAYING OPERATIONS TO A MARINE VESSEL
Filed Nov. 8, 1968

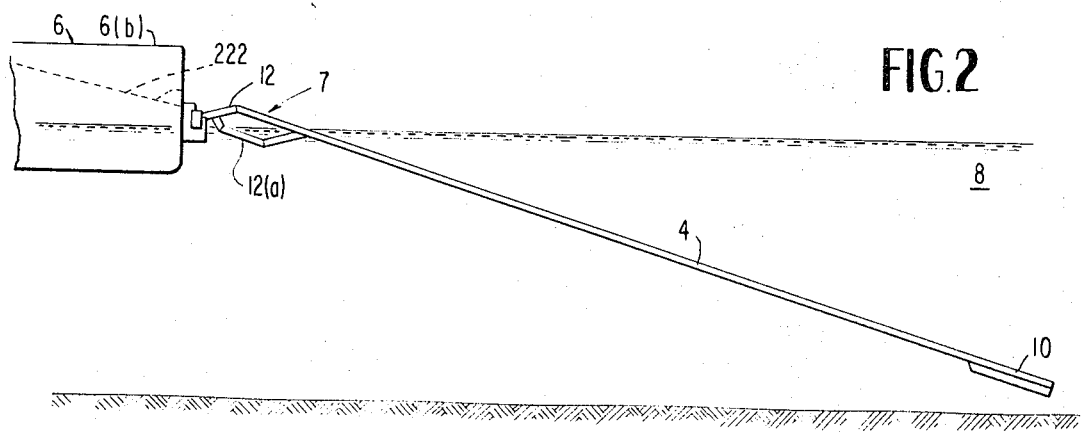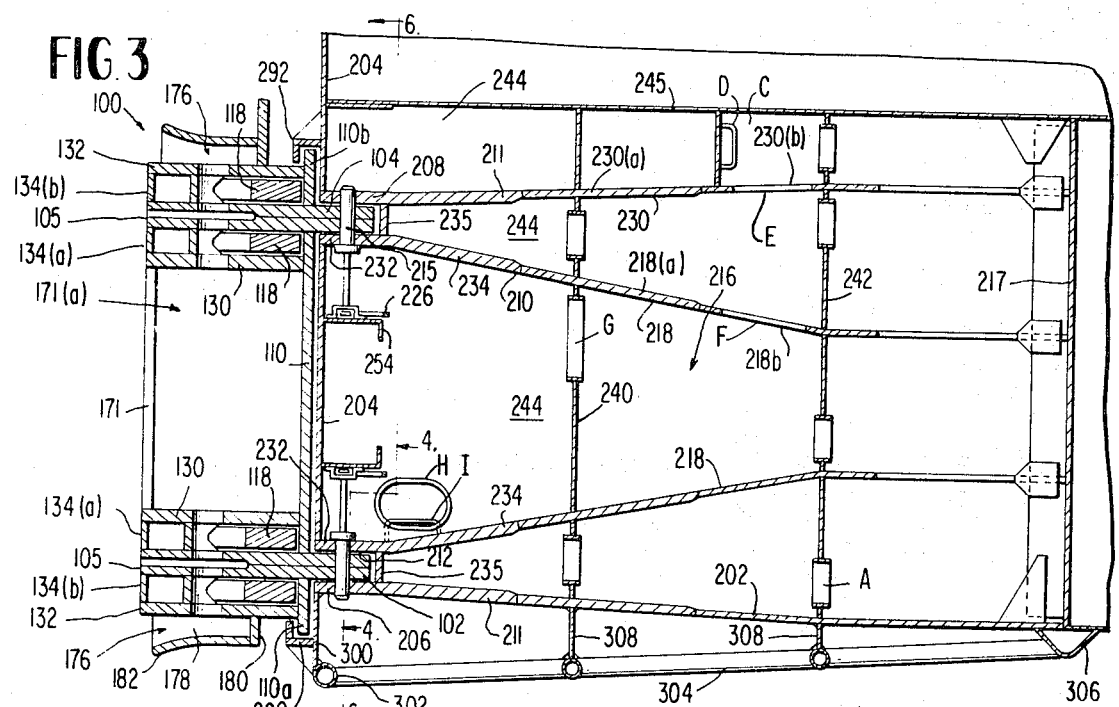

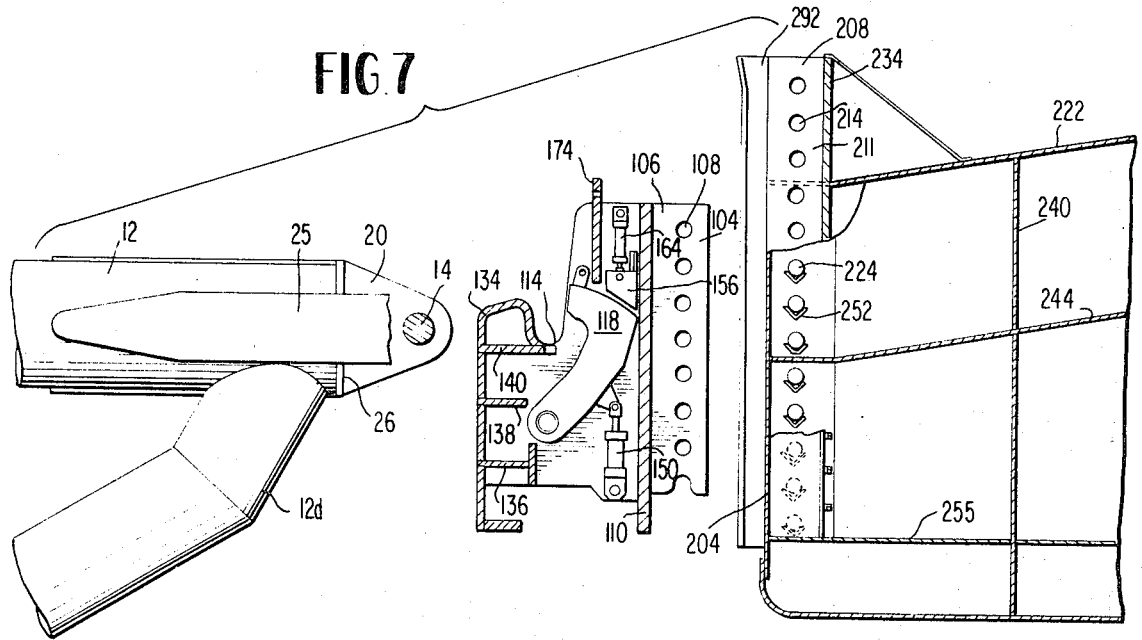
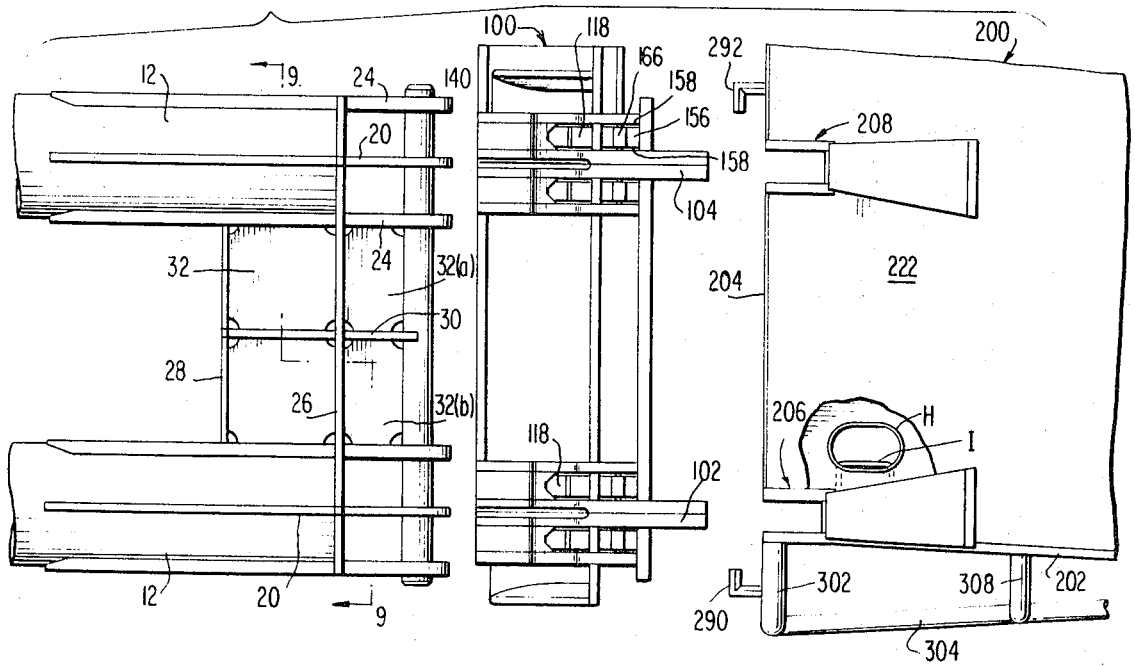
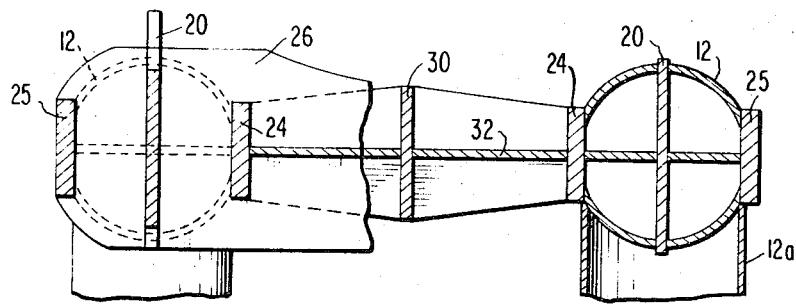

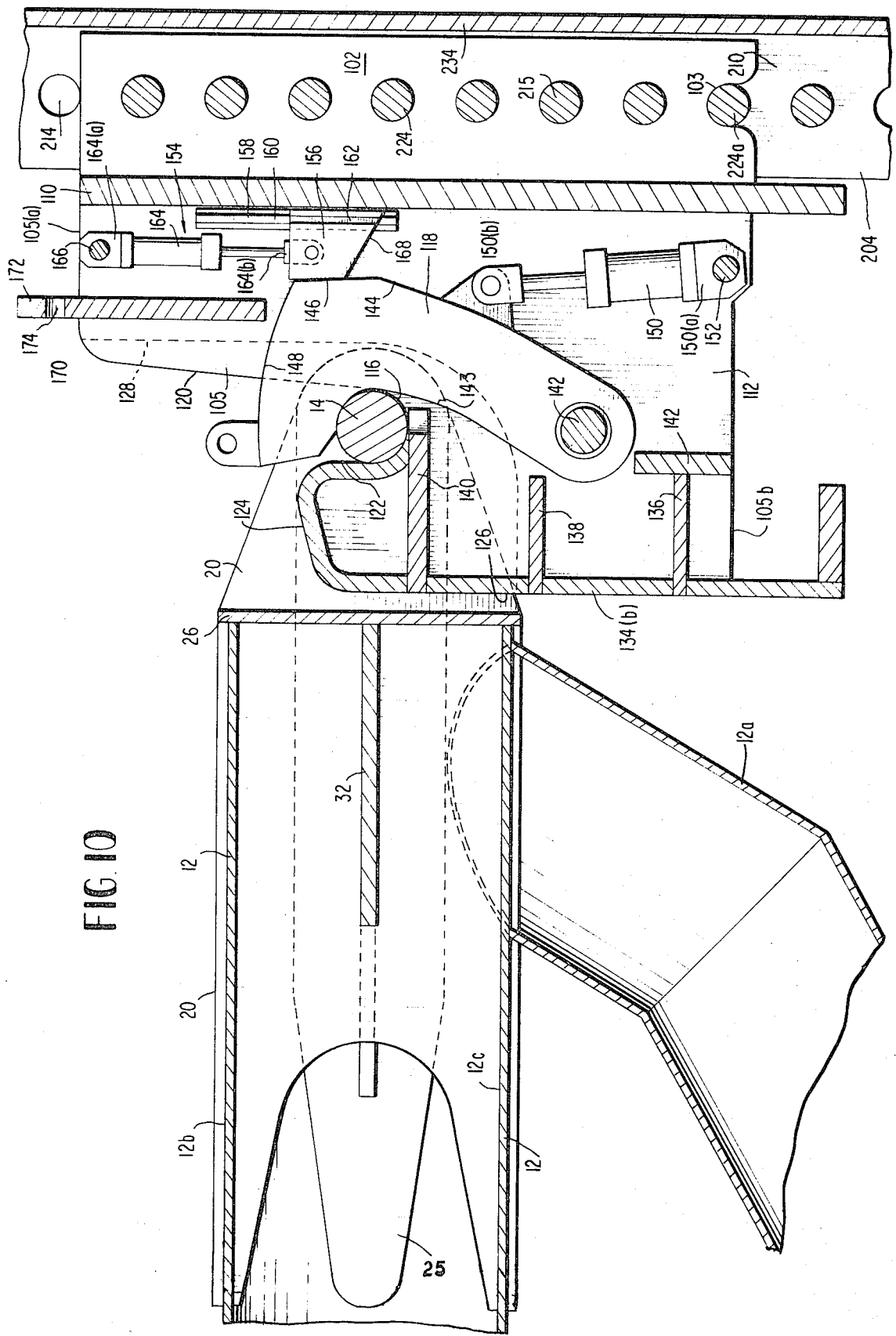

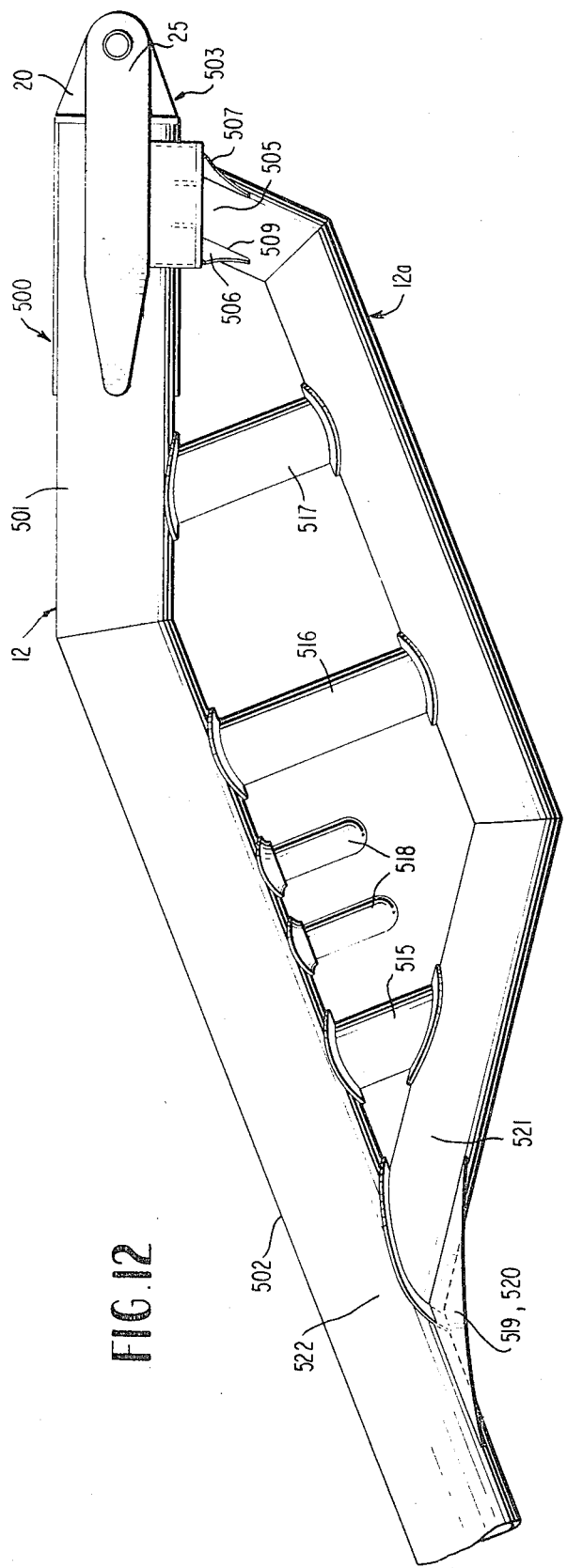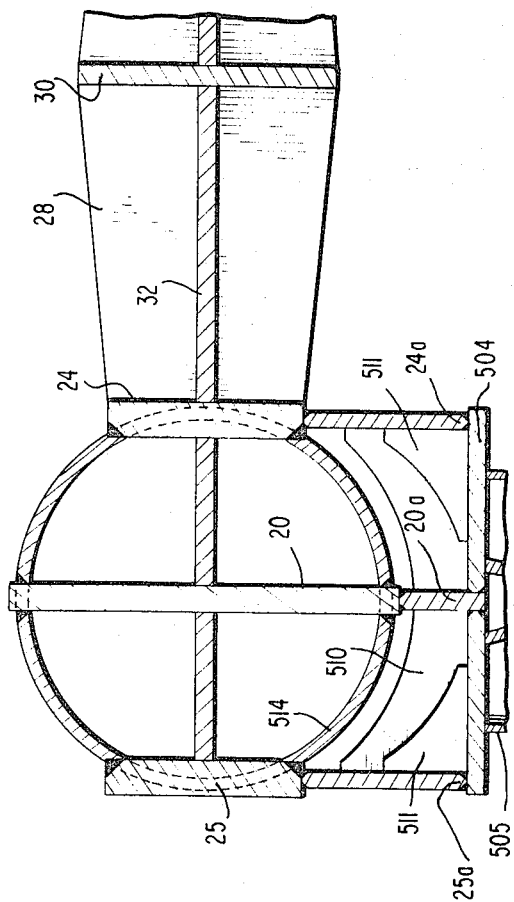

3,538,712
METHOD AND APPARATUS FOR CONNECTING A
RIGID RAMP USED FOR PIPELAYING OPERA-
TIONS TO A MARINE VESSEL
Joe C. Lochridge, William R. Rochelle, and Ardeshir
  Rustomji Desai, Houston, Tex., assignors to Brown
  & Root, Inc., Houston, Tex., a corporation of Texas
  Filed Nov. 8, 1968, Ser. No. 774,476
  Int. Cl. B63b 35/04; B63c 11/00
U.S. Cl. 61—72.3                                14 Claims

ABSTRACT OF THE DISCLOSURE

A connecting assembly which is intended for connecting a longitudinally extending, pipelaying ramp to a marine vessel floating on a body of water. The connecting assembly includes connector means adapted for connection with the ramp and latching means releasably engageable with the connector means. Means is provided for releasably connecting the latching means with the vessel. This means includes first engaging means connected with the latching means and second engaging means adapted for connection with the vessel. The second engaging means is adapted to be actuated by a diver positioned adjacent the second engaging means to releasably engage the first engaging means. A compartment is mounted on the vessel in fluid communication with the body of water. The compartment surrounds the second engaging means to provide a sheltered water environment thereabout. Access means is connected with the compartment to permit the diver to enter and leave the compartment to actuate the second engaging means in the sheltered water environment.

A connecting assembly including a buoyant pontoon, a hitch, and a vessel stern, all provided with force distributing, reticulated grid networks and with the force transmitting connection between the hitch and vessel stern being recessed forward of the stern.

BACKGROUND OF THE INVENTION

This invention relates to a method and apparatus for connecting a partially immersed ramp with a marine vessel floating on the surface of a body of water. In particular, the invention relates to a connecting system suitable for use with a pipelaying barge provided with an immersed pipe supporting "stinger" or ramp of the type generally disclosed in U.S. Lawrence Pat. No. 3,390,532.

In performing pipelaying operations from a floating marine vessel, one approach is to utilize a partially buoyant ramp, disposed in underlying relation to the pipe being laid, to support the pipe in a desirable configuration. At its upper end the ramp is secured to the floating vessel by a connection assembly or hitch.

One such prior connection assembly, disclosed in the aforementioned U.S. patent to Lawrence, provides a horizontal latching assembly. This assembly includes a plurality of cradle members for receiving a transverse connector bar connected to the front end of the ramp. Latching arms connected with the latching assembly move over the connector bar, once received in the cradle, to lock the connector bar to the latching assembly. The latching assembly is connected with rear portions of the vessel by guide members on the latching assembly which slidably embrace a pair of vertical, transversely spaced, T-section guide tracks fixedly secured to the rear of the vessel extending rearwardly therefrom.

This prior Lawrence structure is generally satisfactory and constitutes a significant advance in the art. Nevertheless, when performing pipelaying operations on the open seas, in areas subject to extremely violent weather conditions (such as the North Sea), it is necessary to provide an exceptionally rugged connection structure which will withstand the exceptional environmental forces.

Also, in providing a connection of this general type, it is necessary to provide means whereby the vertical position of the latching assembly may be varied in relation to the vessel in order to maintain the uppermost part of the ramp in suitable disposition for different angles of inclination of the main part of the ramp to the vessel, during different pipelaying operations.

One way of varying the vertical position of the latching assembly would be to provide a releasable pin and slot connection between the latching assembly and the vessel which could be coupled and uncoupled by a diver operating at the stern of the vessel. However, in the rough weather conditions just discussed, substantial hazard would be encountered by the diver if he were required to function in the open sea in close adjacency to the massive and relatively movably adjacent parts of the ramp, latching assembly and vessel stern.

A particularly vulnerable structural portion of a buoyant ramp, used in pipelaying operations, involves the structure of the ramp where it is connected to a pipelaying vessel. This vulnerability, notwithstanding, the conditions encountered during most pipelaying operations are not so severe as to cause repeated structural failure in this zone. Nevertheless, extraordinary hazardous conditions, such as encountered in the North Sea, require that particular attention be paid to this portion of the buoyant ramp in order to avoid mechanical failure.

OBJECTS AND SUMMARY OF INVENTION

It is therefore a general object of the invention to provide a connection assembly for connecting a ramp to a floating vessel which obviates or minimizes problems of the type previously noted, in unusually difficult operating environments.

It is a particular object of the invention to provide a connecting assembly for connecting a ramp to a marine vessel which is of sufficiently rugged construction to withstand very high forces imposed on the connection assembly by exceptionally violent weather conditions encountered in open seas in certain areas.

It is another object of the invention to provide a connecting assembly of the type utilizing a diver for adjustment of the connecting assembly, wherein the diver is enabled to operate in a protected condition within sheltered water during selective adjustment of the parts of the connecting assembly.

It is still a further object of the invention to provide a reticulated grid network for diffusing forces longitudinally between the upper end of a buoyant ramp, a hitch unit, and the stern of a vessel.

It is likewise an object of the invention to provide a connection between a hitch assembly and a vessel stern which is recessed so as to be disposed forward of the sternmost bulkhead of the vessel in order that the stern of the vessel itself may support and protect this connection.

It is also an object of the invention to provide an arrangement for reinforcing a deflected upper portion of a buoyant ramp so as to provide, as nearly as possible, a generally longitudinal transmission of force between the ramp and a pivot connection supported by a pipelaying vessel.

It is likewise an object of the invention to provide a unique ramp reinforcing structure, including branching pontoon portions, which are united with a reticulated grid network in such a fashion as to transmit force through the grid to a pivot connection of a pipelaying barge.

A connecting assembly according to a preferred embodiment of the invention intended to accomplish some of the foregoing objects, is utilized for connecting a partially immersed rigid ramp to a marine vessel floating on a body of water. The connecting assembly includes connector means adapted for fixed connection with the ramp and latching means releasably engageable with the connector means. Means for releasably connecting the latching means with the vessel includes first engaging means connected to the latching means and second engaging means adapted for connection with the vessel. The second engaging means is further adapted to be actuated by a diver positioned adjacent the second engaging means to releasably engage the first engaging means. A compartment is adapted to be mounted on the vessel in fluid communication with the body of water. The compartment surrounds the second engaging means to provide a water environment thereabout sheltered from the main body of water. Access means is connected with the compartmetnt adapted to permit the diver to enter and leave the compartment.

It will be realized by this construction that the diver is enabled to adjust the connecting assembly while working in a protected environment sheltered from the direct, violent effects of external weather conditions. This arrangement is very valuable in causing the diver's safety to be more completely assured and constitutes an independently significant method aspect of the invention.

In another aspect of the invention, the second engaging means comprises two vertically extending, transversely spaced, channel members having central, vertically extending recessed portions extending into the vessel, forward of the stern. The first engaging means includes two vertically exttending, transversely spaced, support members spaced opposite the recessed portions of the channel members and received therein in tongue and groove relation. The channel members include a plurality of vertically spaced, second openings extending transversely through the channel members while the support members include similar, vertically spaced first openings. By vertical sliding motion of the support members within and along the chanel members during vertical adjustment of the position of the latching assembly relative to the vessel, the first openings are brought into registering alignment with certain of the second openings. A plurality of securing means are separately and selectively movable through the registering ones of the first and second openings to fixedly connect the adjacent support and channel members together.

This structure whereby the support members of the latching assembly are received in recessed portions, extending directly into the vessel, provides very rugged support for the latching assembly on the vessel, enabling it to withstand extremely high external forces encountered during violent weather conditions.

Furthermore, the support members extend directly away from the vessel in the form of cradle members for underlying and supporting a connector bar secured to the forward end of the ramp. Thus, there is direct mechanical connection between the cradle members supporting the connector bar on the ramp and the channel members forming a part of the vessel which provides additional strength.

The overall strength of the unit is further enhanced by providing connector bar carriers connected to the ramp, with the carriers being formed as rigid, rectangularly disposed webs extending deep into the adjacent portions of the ramp to diffuse the connector bar loads into tthe ramp without high local stress concentrations.

Another independently significant facet of the invention entails an assembly comprising the upper end of the buoyant ramp, a hitch unit, and a vessel stern. Each of these components is provided with a force distributing, reticulated grid network. The connection between the hitch and the vessel stern is recessed into the stern and is disposed forward of the sternmost bulkhead of the vessel.

A still further independently significant aspect of the invention pertains to a buoyant ramp including a lower body portion and an upper body portion. The upper body portion is connected to, but deflected relative to, the lower body portion. A generally U-shaped connecting means interconnects the deflected upper body portion and the lower body portion. The deflected body portion supports means for pivotally connecting the ramp to a connecting means carried by a pipelaying vessel. A reticulated grid provides a force transmitting connection between the connecting means and the U-shaped reinforcing means.

THE DRAWINGS

A connecting assembly for connecting a ramp to a marine vessel, constructed in accordance with the preferred embodiment of the invention is illustrated in the accompanying drawings in which, FIG. 1 is an exploded, perspective view, of a connecting assembly according to one preferred embodiment of the invention;

FIG. 2 is a simplified side view of a ramp connected to a marine vessel floating on a body of water by a connecting assembly of the type shown in FIG. 1;

FIG. 3 is a cross-sectional plain view of a portion of the connecting assembly shown in FIG. 1 showing certain adjacent portions of the marine vessel, when the connecting assembly and vessel are joined, as viewed generally along the view direction 3—3;

FIG. 4 is an enlarged, cross-sectional end view of a portion of the assembly shown in FIG. 3 taken along the lines 4—4 therein;

FIG. 5 is a cross-sectional side view of a portion of the assembly shown in FIG. 4 taken along the lines 5—5;

FIG. 7 is a side view, partially in cross-section, of the exploded sections of the assembly shown in FIG. 1;

FIG. 8 is a top view of the portions of the assembly shown in FIG. 7;

FIG. 9 is a cross-sectional, enlarged, end view of the portion of the assembly shown in FIG. 8 taken along the lines 9—9 therein;

FIG. 10 is a cross-sectional, side view on an enlarged scale of the forward end of the ramp shown engaged with the connecting assembly;

Figure 1:
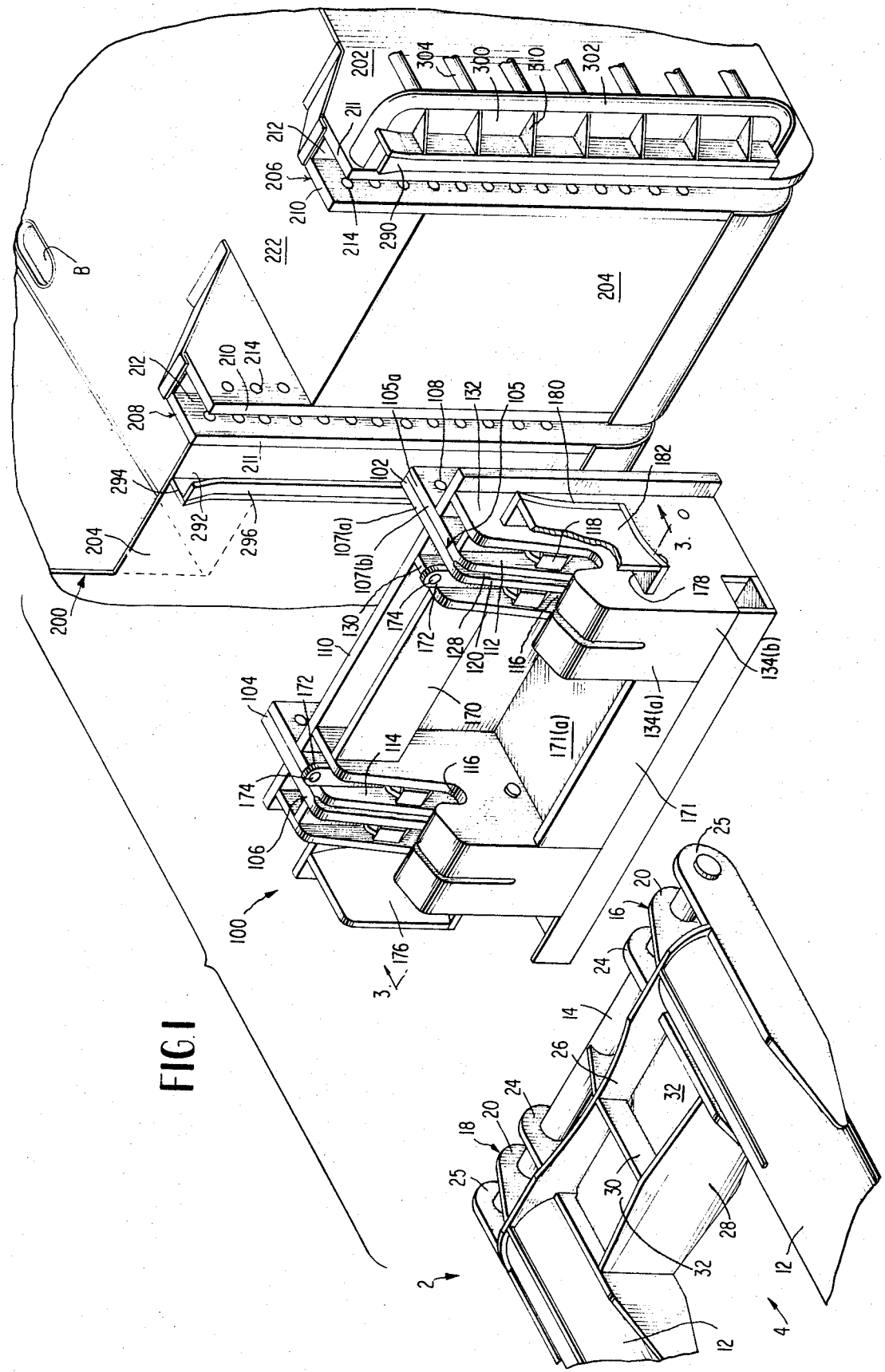
Figure 13:
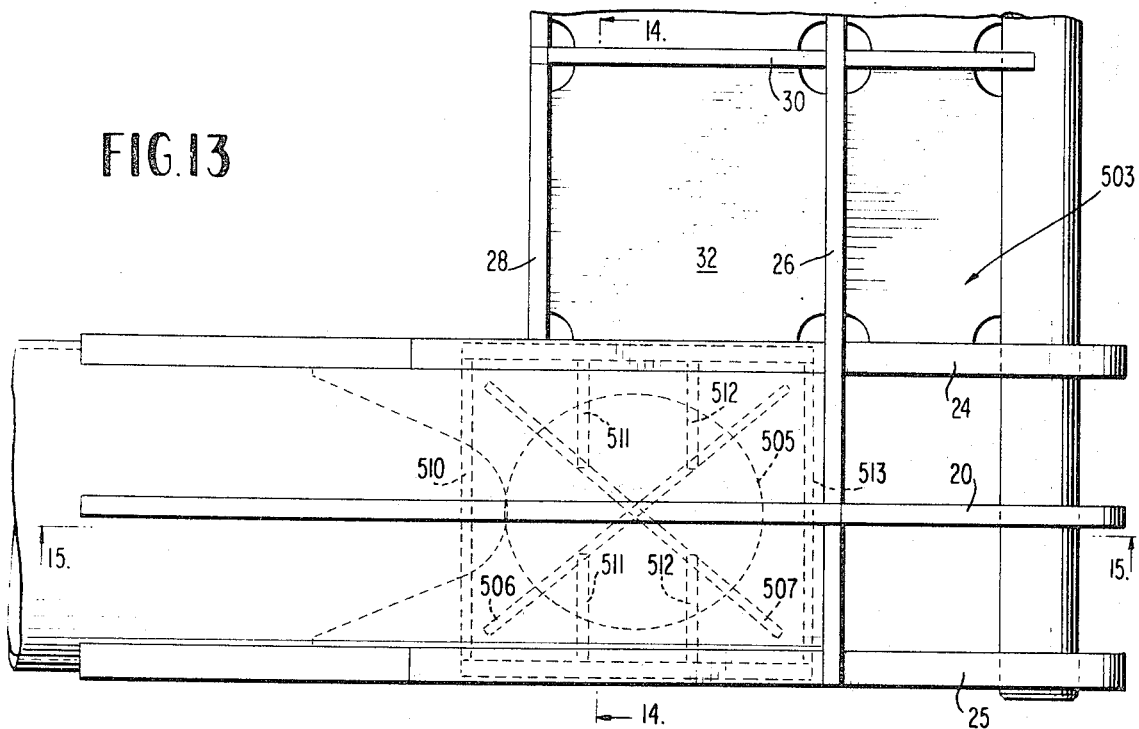
Figure 15:
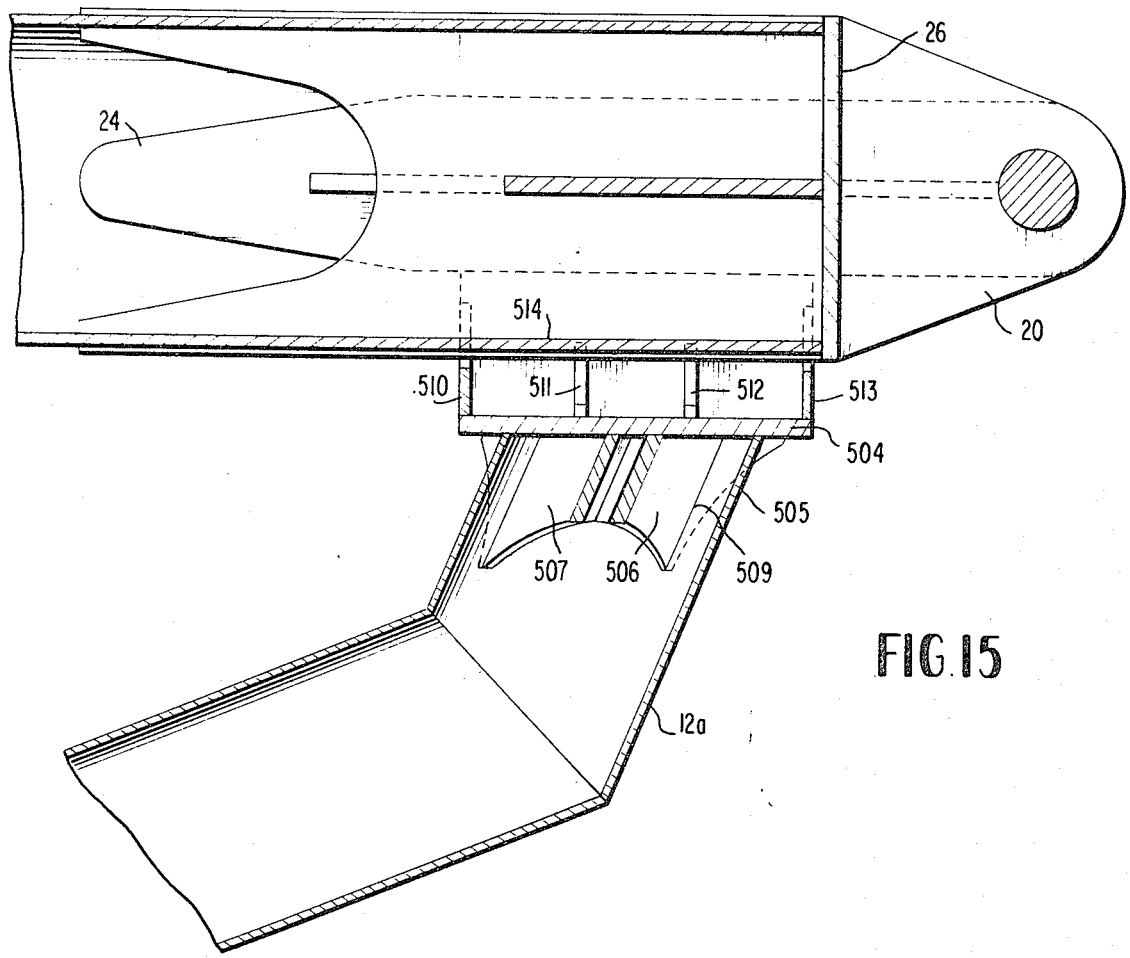

FIG. 12 provides a side elevational view of a modified form of the upper end of the FIG. 1 ramp, illustrating a particularly rugged ramp structure which is uniquely suited for operations in extraordinarily difficult operational environments;

FIG. 13 provides an enlarged, top plan view of a star board portion of the FIG. 12 assembly;

FIG. 14 provides an enlarged, vertically sectioned, transverse elevational view of the FIG. 12 assembly, as viewed along section 14—14 of FIG. 13; and FIG. 15 provides an enlarged, longitudinally extending, vertically sectioned view of one of the pontoon portions of the FIG. 12 assembly, as viewed along the section line 15—15 of FIG. 13.

DETAILED DESCRIPTION

Application of numerals to the drawings

Referring to FIG. 1 of the drawings, a connecting assembly constructed according to a preferred embodiment of the invention may be seen to comprise three main subassemblies; namely, a ramp upper end assembly 2, a latching assembly 100, and a vessel assembly 200. To assist in relating drawing numerals to the written description hereafter, the following numbering arrangement is adopted:

(a) Numerals in the range 10–99 are assigned to elements of the upper assembly 2 of a buoyant, elongate pipe supporting ramp 4;

(b) Numerals in the range 100–199 are assigned to elements of the latching assembly 100; and (c) Numerals in excess of 200 are assigned to elements of a stern assembly 200 of a floating vessel or pipelaying barge 6.

General summary

The connecting assembly of the present invention is utilized to connect the elongate pipelaying ramp 4 (FIG. 2) with the marine vessel 6, floating on the surface of a body of water 8.

The ramp 4 includes a forward end 7 and extends longitudinally and downwardly away from the vessel to a lower, buoyant or "floating" rear end 10. The ramp 4 may be generally rigid as illustrated, consistent with the ramp structure of the aforesaid Lawrence Pat. 3,390,532. Alternatively the ramp may be articulated, as indicated generally in our prior U.S. application Ser. No. 690,005, filed Jan. 5, 1968 and entitled "Marine Apparatus for Supporting Elongate Pipe Means During Underwater Laying Thereof." In any event the ramp may have its buoyancy varied along its length to vary the angle or orientation at which the ramp floats in the water. The length of the ramp, often several hundred feet, imparts a degree of flexibility to the ramp. Pipe being laid from the floating vessel 6 overlies and is supported by the ramp 4 during passage of the pipe to the sea bed. At its upper end 8 the buoyant and submerged ramp 4 includes two, generally horizontal, transversely spaced, hollow tubular portions 12 (FIG. 1). A more detailed description of the ramp 4, and the overall vessel structure and mode of operation, is provided in the aforementioned U.S. Lawrence Pat. No. 3,390,532.

In summary, it is sufficient to here note that a pipeline is laid with this assembly while the pipeline is supported by an inclined ramp portion of the vessel 6 and the submerged ramp 4. Ramp 4 defines a downwardly projecting and buoyant continuation of the vessel ramp. Pipe supporting roller and cradle assemblies are disposed along the ramp 4 and the pipe supporting ramp of the vessel 6, as generally indicated in the aforementioned Lawrence Pat. No. 3,390,532.

On the vessel 6, appropriate stations are provided for welding pipeline sections as they are fed along the vessel ramp. A tensioning unit is provided on the vessel ramp, as described in the aforementioned Lawrence patent, to maintain appropriate tension control over the pipeline as it is being laid.

A buoyancy control system associated with the buoyant ramp 4, and described in the aforesaid Lawrence Pat. No. 3,390,532, serves to maintain an appropriate disposition for the submerged ramp 4 so as to minimize forces exerted on the submerged portion of the pipeline. In this connection, it will be appreciated that this support is effected with the lowermost end 10 of the ramp suspended above the submerged surface upon which the pipeline is to be laid. Since the ramp 4 of the present invention may be used under extremely difficult operating conditions, it is contemplated that the upper ends of the hollow tubular pontoons 12 may be supported on their underside by upwardly facing an generally U-shaped, tubular reinforcing networks 12a. As will be apparent, by reference to the application drawings, each such U-shaped reinforcing assembly 12a is disposed more or less coplanar with the longitudinal axis of the pontoon 12 with which it is associated.

In the manner described in the aforementioned Lawrence Pat. No. 3,390,532, the pontoons 12 are divided longitudinally into separate, buoyancy controlled compartments so as to enable selectively adjustable buoyancy forces to be exerted at a series of longitudinally spaced points along the ramp 4.

At the rear end of the marine vessel 6 there is provided the previously mentioned main vessel assembly 200. The main vessel assembly 200 (FIG. 1) is built directly into the structure of the floating vessel 6 to be an integral part thereof. Viewing ramp 4 from vessel 6, this vessel 6 includes a vertically and longitudinally extending, left side wall 202 and a vertically and transversely extending, rear or stern wall 204. Mounted at the rear, starboard stern area of the vessel and extending inwardly through the stern wall 204 are transversely spaced, vertically extending, starboard-most and portmost channel members 206 and 208, respectively. Again viewing the assembly so as to look toward the ramp 6, these channel members may be considered as left and right channel members 206 and 208. Each of the channel members 206 and 208 is defined by transversely spaced, opposed longitudinally and vertically extending, inner and outer, plate-like, walls 210 and 211, which define a vertically extending recess 212 between their opposed vertical surfaces. The walls 210 and 211 are provided with a plurality of vertically spaced, aligned, transverse first openings 214.

The function of the recesses 212, in each of the left and right channel members 206 and 208, is to snugly and slidably receive two vertically extending, transversely spaced, left (starboard-most) and right (portmost) tongue members 102 and 104 forming integral portions of left and right support members 105 and 106, respectively, provided on the latching assembly 100. Each of the support members 105 and 106 comprises two uniformly thick, rigid metal plates 107 disposed in side-by-side abutting and welded relation and having a collective transverse thickness generally equal to the transverse thickness of the opposed recess 212, so as to be received slidably and snugly therein. The vertical extent of the tongue members 102, 104 is less than the vertical extent of the corresponding recesses 212 so that the tongue members may be slid vertically up and down within the recesses to vary the relative vertical positioning of the latching assembly 100 to the vessel.

Extending transversely through the tongue members 102 and 104 are a plurality of transversely aligned openings 108 arranged at a vertical spacing equal to that of the spacing between the openings 214. Thus, as the tongue members 102 and 104 are slid vertically within the recesses 212, the first openings 108 will be moved into registering alignment with adjacent ones of the second openings 214. In a manner to be described, a plurality of connectors 215 (FIG. 3) may then be passed through the registering first and second openings to fixedly locate the latching assembly 100 in relation to the vessel assembly 200.

The support members 105 and 106 extend through and are fixedly secured by welding to a vertically and transversely extending, plate-like, body member 110 of the latching assembly 100. When the tongues 102 and 104 are disposed in the recesses 212, the forward surface of the body member 110 is in adjacent, closely spaced, relation to the rear stern wall 204 of the vessel.

The support members 105 and 106 project rearwardly of the body member 110 and are configured to provide left and right cradle members 112 and 114, respectively (which are, of course, integral with the previously mentioned right and left tongue members 102 and 104). The cradle members 112 and 114 are each provided with an upwardly open, downwardly extending slot 116 having a rounded, closed lower end.

The purpose of the slots 116 in the cradle members 112 and 114 is to receive a transversely extending pin means or connector bar 14, forming a part of the previously mentioned ramp, upper end assembly 2. The connector bar 14 is spaced forwardly of the forward ends of the upper end portion 7 of the ramp bar. Bar 14 is fixedly secured to and carried by left and right, plate-like connector bar carriers 16 and 18, respectively, each of which extends longitudinally of the vertical median plane of a pontoon 12. Connector bar carriers 16 and 18 are fixedly and individually connected to the parallel tubes 12 of the ramp.

To connect the ramp 4 to the latching assembly 100, the connector bar 14 is moved downwardly into the slots 116 in the left and right cradle members 112 and 114 until the lower surface of the connector bar 14 contacts the lower ends of the slots 116. Thereafter, a plurality of parallel latching arms 118, forming a part of the latching assembly 100, are moved to an operative position overlying the connector bar 14 to prevent release of the connector bar from the cradle members.

Considering the structure thus far described, it becomes apparent that very rigid and rugged connecting structure for connecting the ramp with the vessel is provided. Particularly significant is the massive side reinforcement afforded to the tongue members 102 and 104 by the channel members 206 and 208 which *extend directly into the vessel,* i.e., forward of the vessel stern. This reinforcement is very effective in stabilizing the latching assembly 100 against twisting forces about a longitudinal-horizontal axis of the latching assembly and in transmitting loads into the vessel structure.

In addition, the plurality of connectors 215 extending through the registering first and second openings are very effective in resisting twisting forces about a horizontal-transverse axis of the latching assembly. The construction whereby the cradles 112 and 116 are integral with the tongue members 102 and 104 is also significant in directly transferring connector bar loads to the vessel structure.

Another aspect of particular interest is the manner in which the latching assembly 100 is connected to the main vessel assembly 200 when the various first and second openings 108 and 214 are in registry.

Figure 6:
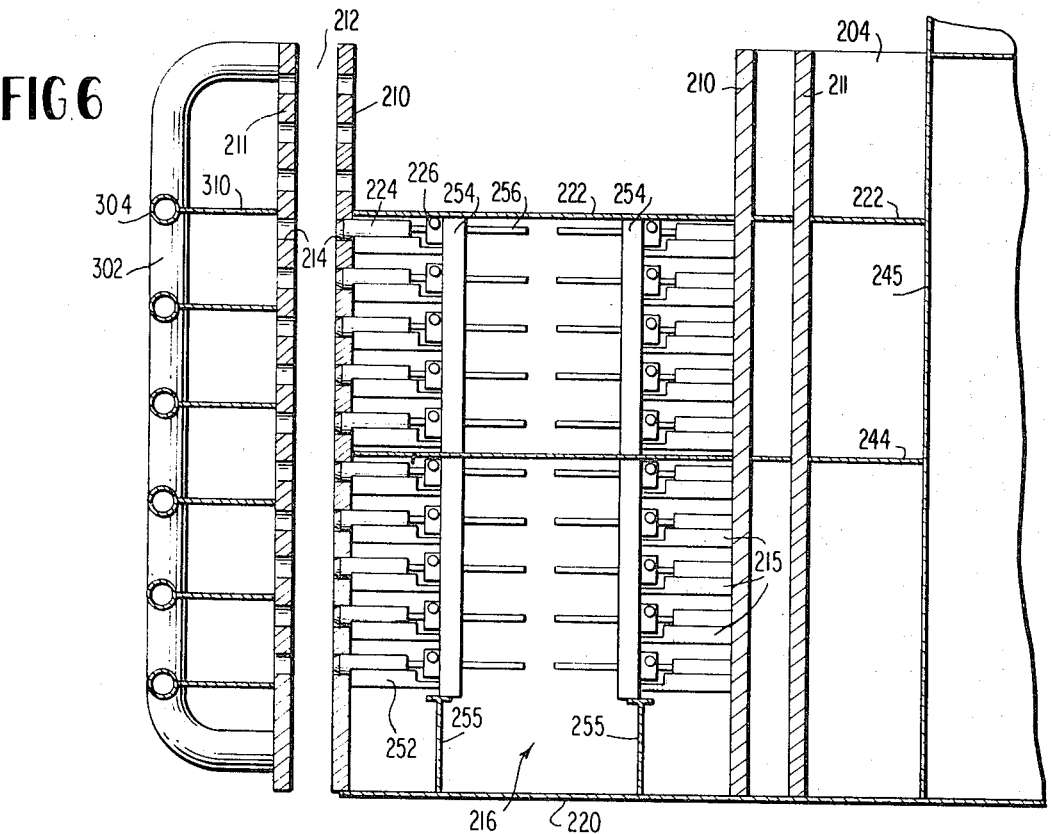
FIG. 6 is a cross-sectional end view of the vessel stern portion only of the assembly shown in FIG. 3, taken along the line 6—6 therein.

Referring to FIGS. 3 and 6, it will be seen that between the left and right channel members 206 and 208, extending rearwardly into the vessel, there is provided a compartment 216. The compartment 216 extends longitudinally between the rear stern wall 204 of the vessel and a vertical, forward transverse bulkhead 217 of the vessel and laterally between transversely spaced internal vertical side walls 218, extending longitudinally between the channel members 206, 208 and the transverse bulkhead 217.

In addition, the chamber 216 is enclosed by a generally horizontal lower wall 220 and generally horizontal upper wall 222. This wall 222 defines the floor of an inclined pipe supporting ramp, supporting a plurality of pipe cradles, as shown in the aforementioned Lawrence Pat. 3,390,532.

As the major portion of the main vessel assembly 200 is below the waterline during use, water normally enters the chamber 216 through various of the openings 214 to maintain it in an at least partially, and generally substantially fully flooded condition.

As will be apparent, by reference to FIGS. 1 and 2, pipe supporting wall or ramp 222 extends longitudinally along the starboard side of the vessel 6. Ramp 222 is inclined upwardly from the vessel stern and projects along the vessel so as to pass through various welding and pipe tensioning stations, in the manner generally described in the Lawrence Pat. 3,390,532.

It has been found desirable for the pipe supporting ramp 222, at least at the stern of the vessel, to be disposed at a somewhat lower elevation than more starboard portions 6a of the vessel. With this arrangement, pipe handling and storage equipment may be supported on a main deck 6b, shown schematically in FIG. 2, disposed generally to the port side of and above the pipe ramp 222.

Secured to each of the channel members 206 and 208, internally of the chamber 216, are the plurality of connectors 215 (FIG. 6).

Each such connector comprises a cylindrical plunger 224 located adjacent an associated one of the previously mentioned first openings 214. Associated with each of the plungers 224 is a drive shaft 226 for selectively advancing the plunger 215, out through the adjacent opening 214 in the inner wall 210 of the channel member, through a laterally aligned one of the openings 108 in the adjacent tongue member (when received within the recess 212 in the channel member), and into a corresponding opening 214 in the outer wall 211 of the channel member.

When the tongue members 102 are initially slid into the grooves 212, it will be understood that, of course, the various plungers 224 are all withdrawn internally into the chamber 216, except for the two plungers which are to define the lowermost projected plunger in the channels 206 and 208. The latching assembly 100 is moved vertically to a desired vertical position relative to the vessel by suitable winching equipment, not shown, so that the openings 108 are in registering alignment with adjacent ones of the openings 214.

Assembly 100 is then lowered, so that laterally projecting guide web portions 110(a) and 110(b) of rear wall means 110 slide, in a loosely telescoping fashion, into vertically extending guide channels or pockets 290 and 292, subsequently discussed.

The lowering of assembly 100 continues until, as shown in FIG. 10, notch 103, at the lower end of each tongue member 102 and 104, engages the previously projected plungers 224(a) in the channels 206 and 208. These projected plungers 224(a) are selected, amongst the available plungers 224, to define the desired elevation of the assembly 100.

A diver, sent down into the flooded compartment 216, is provided with an air motor for selectively actuating the various drive shafts 226 to drive their associated plungers 224 outwardly through the aligned openings 108 and 214 to fixedly connect the tongue members 102, 104 with the channel members 206, 208. At the outset, it may be necessary to slightly "rock" assembly 100 about plungers 224(a) to align apertures 108 with the apertures 214, so that the first of upper plungers 224 may be inserted.

It will be appreciated that by enabling the diver to work within the compartment 216, he is sheltered from the outside sea thereby providing significant safety advantages.

After hitch unit 100 has been connected to vessel 6, hoisting means on vessel 6 serves to manipulate connector means 14 into assembled relation with the hitch. This assembly techniques will be better appreciated in light of the following discussion of ramp structure.

The ramp upper end assembly

The ramp upper end assembly 2 (FIGS. 8, 9 and 10) includes the previously mentioned connector bar 14, which is a solid, rigid, cylindrical bar. The bar 14 extends transversely beyond the adjacent upper tube portions 12 of the ramp 4. Bar 14 is spaced a short distance forwardly from the forward ends of the tube portions 12 and is disposed generally in a horizontal median plane of the tube portions 12.

As previously mentioned, support for the connector bar 14 is effected by the left and right bar carriers 16 and 18.

Each bar carrier may be seen to include a vertically and longitudinally extending central plate 20 having a generally triangular forward end which is fixedly connected to the connector bar 14. Each central plate 20 extends centrally and rearwardly into one of the tube portions 12 of the ramp and projects, through tube slots 12(b) and 12(c) vertically above and below the tube portions. Each plate 20 is welded to wall portions of its tube portion 12, adjacent the slots 12(b) and 12(c).

Spaced on opposite transverse sides of each central plate 20, and extending parallel thereto, are inner and outer bracing plates 24 and 25, respectively. Each bracing plate 24 and 25 also includes a generally triangular end portion fixedly connected to the connector bar 14.

Each bracing plate is welded to its tube 12 and extends rearwardly from bar 14 along the transverse inner and outer sideward portions of the associated tube 12 of the ramp 4. As shown in FIG. 9, plates 24 and 25 define "truncated" cylindrical side wall portions of the tubes 12. The central plate 20 and the bracing plates 24 and 25 are all fixedly secured to the adjacent tube 12 by welding or the like and provide a particularly rigid connection between the connector bar 14 and the ramp 4.

Additional strengthening is provided by transverse web members (FIGS. 8 and 9). These web members 26, 28, 30, and 32 are fixedly connected with the central and bracing plates to provide a grid-like structure of high rigidity.

These web members include a vertically and transversely extending front web 26 which is connected to the forward radial end faces of the spaced tubes 12 of the ramp. As shown in FIG. 8, web 26 extends between the spaced tubes 12. This front web 26 is fixedly connected by welding to the previously mentioned central and bracing plates 20, 24, and 25 of both the bar carriers 16 and 18.

A rear web 28 spaced rearwardly from the front web 26 and extending parallel thereto, extends between the facing side surfaces 24 of the opposed tube portions 12 and is in addition fixedly connected with the inner bracing plates 24.

To provide additional support for the central portion of the connector bar, a longitudinally extending middle plate 30 has a generally triangular forward end connected to the connector bar 14. Plate 30 extends rearwardly from bar 14 along the central line of the ramp and is fixedly secured to the previously mentioned forward and rear transverse webs 26 and 28.

Still further bracing is provided by a horizontal, transverse plate 32. This plate is disposed generally in the horizontal median plane of the tube portions 12 and extends transversely thereinto. The plate 32 extends longitudinally between, and is fixedly connected to, the forward and rear webs 26 and 28. At each of the junctions of the horizontal plate 32 with the various central and reinforcing plates 20 and 24 and with the middle plate 30, a rigid welded connection is provided to increase the overall rigidity of the structure. In addition, the central plate 32 is extended forwardly between the inner bracing plates 24 to provide portions 32(a) and 32(b) which are secured to the forward web 26 and the connector bar 14, to provide additional reinforcement for the central portion thereof.

It is to be appreciated that the just described, reticulated, grid-like structure comprising the various reinforcing plates, transverse webs and horizontal median plate meeting each other in mutually perpendicular, three-dimensional relation provides a particularly rigid and rugged connection between the connector bar 14 and the ramp 4. Furthermore, this construction is very effective in diffusing the loads at the connector bar 14 into the ramp portions 12 in such a way as to avoid the development of any extremely high localized stress distribution within the ramp portions which might otherwise lead to localized failure.

The latching assembly

The latching assembly 100 (FIG. 1) includes the previously mentioned body 110.

Body 110 comprises a vertically and transversely extending, rectangular metal plate of substantial thickness and rigidity. The body means 110 is provided with transversely spaced, vertically extending interruptions to receive the previously mentioned left and right support members 105 and 106 in welded, interconnected relation.

As each of the support members is similar, description of the left support member 105 only will be given and it will be understood that the right support member is of the same construction.

The support member 105 is of generally planar construction and has a horizontal upper edge 105(a) level with the upper edge of the body 110 (FIGS. 1 and 10) and a lower edge 105(b) spaced a short distance above the lower edge of the body 110. the portion of the support member 105 projecting forwardly of the body 110 constitutes the previously mentioned tongue member 102. The tongue member 102 is of planar form and the previously mentioned openings 108 are spaced vertically and generally centrally along this tongue member. When the openings 108 are registered with corresponding openings 214 in the adjacent channel member 206, the forward surface of the body 110 is spaced parallel to and closely adjacent the rearward surface of the stern wall 204 of the vessel.

The portions of the support members 105 and 106 projecting rearwardly of the body 110 constitutes identical cradle members 112 and 114, respectively. The cradle member 112, like member 114, includes an upper, rearward, vertical edge 120 extending between the upper edge of the support member 105 and the slot 116. A forward-facing vertical edge 122 (FIG. 10), extending upwardly from the forward portion of the slot 116, blends into a downwardly and forwardly extending camming edge 124. In turn, the camming edge 124 blends into a vertically and downwardly extending rear edge 126.

A central, longitudinally and vertically extending, groove or slot 128 (FIGS. 1, 10 and 11) is provided in the rearward vertical edge 120 of the support member 105. The groove 128 extends downwardly and rearwardly, below the slot 116, to intersect the rearward edge 126. The groove 128 is formed by recessed facing portions on the opposed adjacent surfaces of the two plates 107(a) and 107(b) comprising the support member 105. The groove 128 is provided for the purpose of telescopingly accommodating the forward edge of a central plate 20, supporting the connector bar 14, when the latter is in the slot 116.

To provide additional support for the connector bar 14 in the cradle, inner and outer side plates 130 and 132 (FIGS. 1 and 11) are spaced transversely on opposite sides of the support member 105 in parallel relation thereto. Side plates 130 and 132 are fixedly secured to the rear surface of the body 110. The inner and outer side plates 130 and 132 have a peripheral profile similar to that of the cradle member 112.

Extending between the cradle portion 112 and each of the adjacent inner and outer side plates 130 and 132 are transversely extending, thick steel, front plate or web means 134(a) and 134(b) shaped to extend conformingly along the rearward edge of the slot 116 and the edges 124 and 126 of the cradle 112 and laterally into alignment with the corresponding aligned edges on the side plates 130 and 132.

The front plates 134(a) and 134(b) extend below the cradle member 112 to a level generally equal to that of the lower edge of the main body 10. These front plates are welded to the adjacent portions of the cradle 112 and the side plates 130 and 132 to provide reinforcement therefor.

Additional reinforcement is provided by three horizontally extending, vertically spaced, transversely, and forwardly extending reinforcing plate means 136, 138 and 140 (FIG. 10). These plate means are welded to the edges of the front plates 134(a) and 134(b) and extend to and are welded to the edges of adjacent portions of the inner and outer side plates 130 and 132 and the cradle 12. The uppermost plate means 40, of the reinforcing plates, at its free rearward end is welded to the internal forward end portion of the front plates 134(a) and 134(b) where they are bent over to conform to the underneath portion of the slot 116. Additionally, the forward-facing end of the lowermost plate means 136, of the reinforcing plates, is secured to a vertically and transversely extending cross web 142. Web 142 extends transversely between the inner and outer side plates 130 and 132.

Figure 11:
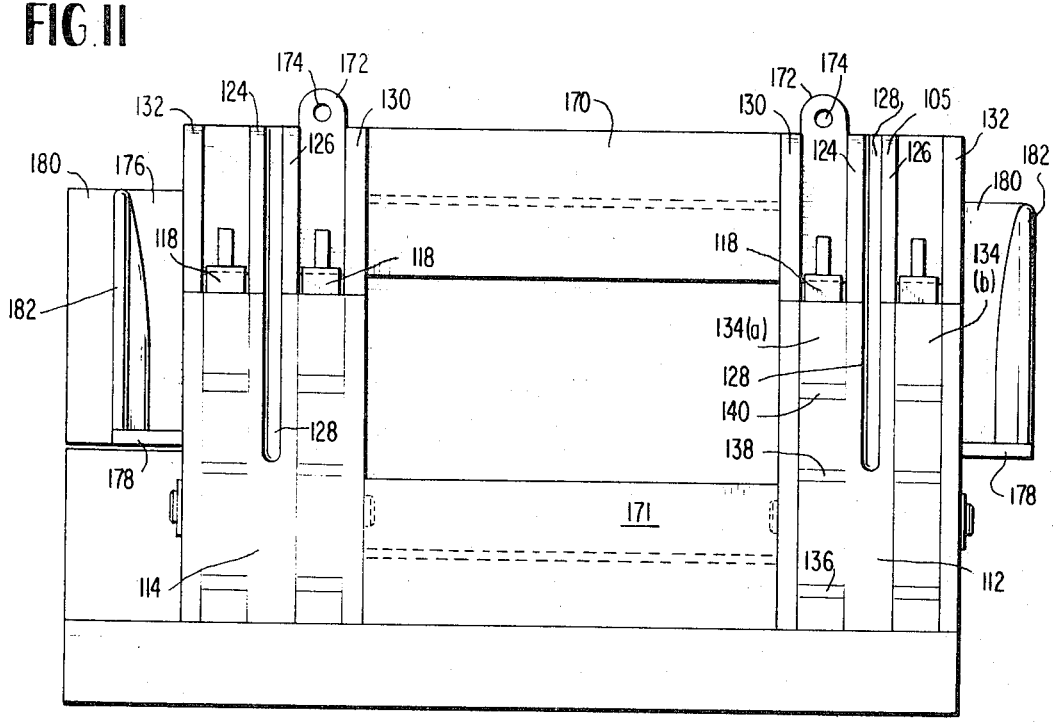
FIG. 11 is an elevational view of the latching unit included in the FIG. 1 assembly, looking forward from aft of this unit, illustrating greater detail than is shown in FIG. 1.

The interconnection between web means 134(a), 134 (b), cradles 112 and 114, plates 130 and 132, and plates 140, 130 and 136, is shown in FIGS 10 and 11. This grid-like interconnection, which provides a "flush" or plate-like exterior for the rear of connector 100, is shown as in FIG. 1.

To retain the connector bar 14 within the slots 116 in the left and right cradles and the associated side plates, the previously mentioned latching arms 18 (FIG. 1) are provided.

Adjacent the right cradle 112, two of the latching arms 118 are positioned on opposite sides of the cradle 112 between the cradle and the adjacent inner and outer side plates 130 and 132. Each of these latching arms 118 (FIG. 10) is pivotally connected at its lower end to a horizontal transverse pivot shaft 142. Shaft 142 extends between and is mounted on the side plates 130 and 132 and the cradle 112. The pivot shaft is positioned generally vertically beneath the slot 116.

Each latching arm 118 extends upwardly from the pivot shaft 142 and includes a rearward edge surface 143. The edge surface 143, adjacent its upper end, is configured to matingly embrace the adjacent exterior peripherial surface of the connector bar 14 over the rear upper quadrantal surface thereof, when the latching arm 118 is in a forward, operative position. In addition, the latching arm 118 includes a forward-facing edge surface 114 having an upper, rearwardly facing, planar face portion 146. This portion 146 converges downwardly toward the rear face of plate or body means 110 and is spaced rearwardly therefrom when the latching arm 118 is in the operative or latching position shown in FIG. 10. An upper edge surface 148 of the latching arm 118 extending forwardly from the edge 146, is of arcuate configuration.

Each latching arm 118 is provided with an individual latching arm motor 150 (FIG. 10) for moving the latching arm 118 between operative and inoperative positions, i.e., in and out of engagement with the connector bar 14.

The motors 150 each comprise double-acting hydraulic jacks. Each jack has a cylinder end 150(a) which is pivotally connected to a transversely extending shaft 152. This shaft 152 is mounted in, and extends horizontally through, the inner and outer side plates 130 and 132 and the central cradle adjacent the lower ends thereof and is spaced closely adjacent the body 110. The piston end 150(b) of each of the hydraulic jacks 150 is pivotally connected to the associated latching arm 118 adjacent the midpoint of the rear edge 144 thereof.

In the extended position, the piston of the jack 150 causes the associated latching arm 118 to be rotated upwardly above the pivot shaft 142 to the engaged position contacting and embracing the connector bar 14. Retraction of the piston of the hydraulic motor 150 causes the latching arm 118 to be rotated downwardly about the pivot shaft 142, entirely out of the slot 116, to free the connector bar 14 for release.

To relieve each motor 150 of the full burden of holding the connector bar 14 engaged within the slot, each latching arm 118 has associated with it one of four locking assemblies 154. Each locking assembly 154 includes a movable, generally wedge shaped, locking block 156, which, in a locking position of the locking assembly, is positioned between the body 110 and the upper rear surface portion 146 of the associated latching arm 118. The locking block 156, which conformingly engages surface 146, prevents rotational movement of the associated latching arm 118 about the shaft 142 out of engagement with the connector bar.

The wedge shaped cavity defined by surface 146 and the rear surface of plate means 110 enables the wedge shaped block 156 to move downwardly until it generally matingly engages the surface 146 of its associated arm 118. Thus, regardless of wear on surface 146 or blocks 156, or minor variations in positioning of arms 118 or blocks 156, the blocks 156 will be able to snugly engage and secure the arms 118 in their latching positions.

Each locking block 156 is guided for vertical movement by two transversely spaced, opposed guide members (FIGS. 8 and 10) mounted on mutually facing surfaces of the cradle 112 and the side plates 130 and 132. Each of the guide members 158 extends vertically and is provided with a transversely extending central rib 160 slidably received within a mating vertical groove 162 in the locking block 156. The rib 160 and groove 162 cooperate to guide the locking block 156 vertically.

The vertical motion of each block 156 is effected by one of four hydraulic jacks 163 connected with the locking assemblies. Each of the hydraulic jacks 164 has its upper, cylinder end 164(a) pivotally connected to a transversely extending shaft 166. This shaft is mounted on, and extends between, the adjacent side plates 130 and 132. The lower piston end 164(b) of each jack 164 is connected with one of the locking blocks 156.

In an extended position of the piston, the locking block 156 is disposed in a locking or operative position between the latching member 118 and the body web means 110. Retraction of the hydraulic jack 164 causes the locking block 156 to be withdrawn upwardly out of the way of the latching arm 118. Actuation of the hydraulic jack 150 connected to the associated latching arm 118 may then be effected to move the latching arm downwardly and forwardly to the inoperative position to release the connector bar 14.

Further bracing for the locking assembly 100 is provided by a transverse support or web-like beam 170 (FIGS. 1 and 11). This web means 170 extends between, and is welded to, the inner side plate 130 associated with the right cradle 112 and the inner side plate 130 associated with the left cradle 114. The support beam 170 is thus fixedly connected to each of the cradles and their inner side support plates and provides additional rigidity and force dispersion for the unit.

A vertical web 171, defining a horizontal continuation of web means 134(a), extends between plates 130, as shown in FIG. 1. As horizontal web 171(a), extending perpendicular to web 171, also connects the plates 130.

The support beam 170 comprises a generally vertical thick rigid, rectangular plate. Lateral extensions of beam 170, provided with upwardly extending brackets 172 (FIG. 11), define lifting eyes 174 interposed between plates 130 and cradles 112 and 114. Suitable winching and lifting equipment may be connected to the lifting eyes 174 for raising and lowering the entire locking assembly 100 relative to the main vessel in assembly.

Also forming a part of the locking assembly 100 is guiding structure for contacting parts of the ramp upper ramp end assembly 2 during motion of the connector bar 14 into slots 116, in order to centralize the ramp upper end assembly 2 transversely in relation to the locking assembly 100.

This guiding structure includes two guide pockets 176 (FIG. 1) disposed at opposite transverse ends of the locking assembly 100. Each guide pocket 176 is defined by a horizontally disposed base plate 178 (FIG. 11) spaced below the lower extremity of the slot 116. Each plate 178 is fixedly secured to, and extends sidewardly from, an outer side plate 132. Extending upwardly from each base plate 178, secured to the side plate 132 and projecting transversely outwardly therefrom, is an end plate 180 (FIG. 1) spaced forwardly of the slot 116. Secured to the outer transverse extremities of the base plate 178 and the end plate 180 is a vertically and longitudinally extending guide or camming plate 182. The guide plate 182 is curved in two planes, being curved upwardly and transversely away from the adjacent side plate 132 and also being curved rearwardly and transversely away from the adjacent surface 132.

As the ramp assembly 2 is lowered towards the slots 116 in the latching assembly 100, the outer bracing plates 25 of the bar carriers contact the inner surface of the guide walls 182 of the guide pockets and are thereby guided into transversely aligned relation with the locking assembly. This ensures that the central plates 20 of the ramp upper end assembly 2 are centralized and aligned with the corresponding vertical slots 128 in the cradles 112 and 114 to be received therein.

Once the ramp 4 has been connected to the latching assembly 100, it is supported against transverse displacement relative thereto. This support against transverse displacement is provided at each of the bar carriers 16 and 18 by face-to-face engagement of the associated inner and outer bracing plates 24 and 25 against the outer surfaces of the adjacent inner and outer side plates 130 and 132, respectively, on the latching assembly. Additional support is provided by engagement of the central plate 20 against the sides of the slot 128.

As will be appreciated, piston and cylinder assemblies 150 and 164 will be remotely actuated, for example from a deck portion of vessel 6, in order to secure the ramp in place.

After, or before, the ramp 4 has been secured it may be necessary to adjust the elevation of pipe supporting cradles on deck 222. This adjustment may be necessary to insure that the pipeline support provided on the deck 222 of the vessel 6 is properly aligned, in elevations, with respect to the pipe supporting roller-cradles carried by ramp 4. The adjustment in elevation of the pipeline supporting roller cradles on deck 222 may be effected as described generally in the aforesaid U.S. Lawrence Pat. No. 3,390,532.

The vessel assembly

Each of the first and second channel members 206 and 208 includes the previously mentioned vertically extending, transversely spaced, inner and outer walls 210 and 211 (FIG. 3).

The outer wall 211 of the left channel member 206 forms an integral part of the starboard side wall 202 of the vessel and is flush with the forwardly extending adjacent portions thereof. Adjacent its extreme rearward end, this left side wall 211 is slightly angled to be directed perpendicularly to the plane of the stern wall 204 of the vessel.

The outerwall 211 of the right channel member 208 is of generally similar construction as that of the left channel member 206. However, instead of being integral with the side wall of the vessel, this wall 211 is integral and flush with a longitudinally and vertically extending internal wall 230 of the vessel.

The inner walls 210 of the right and left channel members 206 and 212, adjacent their rearward ends, include a vertical web portion 232 perpendicular to the stern wall 204. Forward portions 234 of the walls 210 are angled inwardly and forwardly from the rear portions 232. The portions 232 of the inner walls 210, and the opposed parallel surfaces of the adjacent outer walls 211, define the previously mentioned recesses 212.

At their rearward vertical edges, the walls 210 and 211 on each of the channel members 206 and 208 are fixedly secured to adjacent portions of the stern wall 204 of the vessel by welding.

To assist in maintaining the correct spacing of the walls 210 and 211 in the area defining the recess 212, each of the channel members 206 and 208 is provided with a vertically and transversely extending spacing wall 235. Each wall 235 is fixedly secured to the walls 210 and 211 and spaced forwardly of the position occupied by the foremost part of the associated tongue members 102 and 104, as shown in FIG. 3.

The previously mentioned vertical transverse forward bulkhead 217 extends transversely within the vessel 6 and is fixedly secured to adjacent surrounding parts of the structure thereof. At its rearward end, the wall 230 is connected to the outer wall 211 of the right channel member 208.

Also secured to the forward transverse bulkhead 217, and extending rearwardly therefrom, are the previously mentioned internal vertical walls or bulkhead 218. The rearward end of each bulkhead is fixedly connected to and flush with an associated one of the inner walls 210 of the two channel members 206 and 208. Additional transversely and vertically extending bulkheads 240 and 242 are positioned at generally equal, longitudinally spaced, intervals along the compartment 216 and are connected with the walls 202, 218 and 230 to provide added rigidity therefor.

The previously mentioned upper wall 222 extends transversely across the vessel and is inclined downwardly and rearwardly towards the stern wall 204 (FIG. 7). The upper wall 222 is connected to the upper horizontal wall 222 and is connected by suitable bracketing (not shown) to the stern wall 204. Similarly, the lower wall 220 is secured to the lower ends of the walls 210, 217, 218, and 230, to the lower edge of the side wall 202, and to the lower edge of right wall 211, as shown in FIG. 6.

To provide additional bracing, intermediate horizontal wall means 244 are spaced between the upper and lower walls 222 and 220 and extend between right wall 211 and a vertical bulkhead 245.

The enclosed space defined by the upper and lower walls 220 and 222, the two internal side walls 218 and their continuations 210, and the internal transverse wall 217 and the stern wall 204 comprises the portion of the previously mentioned compartment 216 which houses the connecting means 215.

Walls 211 are joined with somewhat thinner portions 230(a) of walls 230. These wall portions 230(a) are in turn joined with thinner wall portions 230(b).

Similarly, walls 210 are joined with thinner portions 218(a) of walls 218. These wall portions 218(a) are in turn joined with still thinner portions 218(b).

As shown in FIGS. 1 and 6, walls 210 and 211 project above deck 222. These walls thus define side walls at the stern end of the ramp defining wall 222.

As will now be appreciated, wall means 202, 204, 220, 222, 210, 211, 217, 218, 230, 240 and 242 provide a reticulated grid, massively reinforcing the channels 206 and 208 and distributing hitch force throughout much of the vessel stern.

Within the compartment 216 are positioned the previously mentioned plungers 215 and associated motors 226 (FIG. 6).

Each of the plungers 224 (FIG. 4) is a cylindrical solid body having a chamfered free end 250 to assist in guiding the plunger through the openings through which it passes.

In a withdrawn condition (FIG. 6) each of the plungers 224 rests upon an associated upwardly facing right angle bracket 252. Each of the brackets 252 has one of its longitudinal ends 252(a) fixedly secured to the adjacent inner wall 210 and its opposite longitudinal end 252(b) supported by a vertically extending support 254. The support 254 is secured at its upper end to the ramp deck wall 222 and rests at its lower end on a longitudinally extending I-section beam 255 secured to the lower wall 220.

In the withdrawn position, the free end 250 of each plunger 224 extends into an opening 214 but is spaced out of the recess 212 so as not to interfere with entry of the tongue members 102 and 104 of the latching assembly into the recess.

After the tongue members 102 and 104 of the latching assembly have been moved into the recesses 212 of the channel members and have been adjusted vertically to bring the openings 108 into registering alignment with various of the openings 214, as earlier described, it is necessary to advance the plungers 224 through the aligned openings 108 and 214. For this purpose each plunger 215 is provided with a concentric threaded shaft 256 (FIG. 4) which extends inwardly of the compartment 216. A rotatable or swivel connection 257 is provided between each plunger 224 and its associated threaded shaft 256.

This rotatable connection is effected by securing a fixed cage 258 to the inner radial end face 224(b) of the plunger 224 with the cage 258 having a rectangular slot 260 extending vertically through it. A longitudinal bore or passage 262 passes through the cage 258, intersects the slot 260 and extends into the plunger 224. Passage 262 rotatably receives the adjacent end of the threaded shaft 256. To retain the shaft 256 axially in relation to the plunger 224, a U-shaped keeper 264 (FIG. 5) is slid downwardly within the slot 260. Keeper 264 includes a lower saddle 266, the legs of which extend into a recessed annular groove 268 extending about the threaded shaft 256.

At its opposite inner ends, the shaft 256 passes through a threaded nut 270. This nut 270 is thus threadedly engaged with the shaft. The nut is rotatably mounted at a fixed transverse spacing from the adjacent inner wall 210 by suitable bracket structure 272 mounted on bracket channel 254. Rotation of the nut 270 causes the shaft 256 to be moved axially through the nut 270 to alternately advance and withdraw the plunger 224, depending upon the direction of nut rotation.

The nut 270 is rotated in forward and reverse directions by a worm and gear connection 274. This drive connection 274 is coupled to the aforementioned drive shaft 226. By connecting an air-operated torque wrench, conventionally used in diving operations, to the drive shaft 226, and by controlling the direction of air flow through the torque wrench, the motor may be rotated in forward and reverse directions to cause the plunger 224 to be withdrawn and advanced as desired.

Access to compartment 216

As has been previously noted, the compartment 216 comprises a flooded or ballasted starboard and stern portion of the pipelaying vessel 6.

Compartment 216 is defined by horizontal boundaries comprising bulkheads 204, 245, 217 and 202. Other vertically extending wall means 211, 230, 210, and 218 extend generally longitudinally through the compartment 216. An intermediate deck-like web means 244, generally paralleling deck 222, extends throughout the compartment means 216 and is connected with the wall means 245, 217, 202, 204, 210, 218, 211 and 230.

Thus, these various bulkheads or wall members cooperate with the horizontal base wall 220 and the deck 222 to provide a reticulated grid-like network of walls and bulkheads.

These bulkheads may be conventionally reinforced by channel-like beam members (not shown).

Communication between the various pockets of the compartment 216, as defined by the various walls and bulkheads, is afforded by passageways or openings A. The distribution of these passages A is such as to permit complete flooding of the compartment 216.

Access to the connectors 215 is provided by a series of passages and hatches including a passage entry B, shown in FIG. 1. This access opening B extends through the inclined pipe-supporting ramp or floor 222 so as to provide access to a generally vertically extending trunk-like passage C. Passage C is disposed between bulkheads 245 and 230, generally adjacent the transversal bulkhead 242. A series of vertically spaced foot rails or rungs D facilitate a diver's being able to move downwardly from the opening B into the interior of the trunk-like passage C.

The diver moves from the passage C through an opening E in wall means 230, located above wall means 244, and then through an opening F in the port side wall means 218. The diver then passes through an opening G in wall means 240 so as to have access to the connecting means 215 disposed in the compartment defined by wall means 244, deck 222, stern bulkhead 204, and bulkhead 240. The diver has access to the connecting units 215 beneath the transversely extending wall 244 by way of an opening H, which is formed in wall 244 adjacent the starboard partition 210. A series of vertically spaced rungs I facilitate the diver moving downwardly through the opening H, so as to have access to the connectors 215 disposed within the compartment defined by walls 210, 204, 240, 244 and 220.

Thus the network or openings B, C, E, G and H enables the diver to move downwardly into the compartment cavity 216, carrying appropriate equipment such as a pneumatic actuated torque wrench, and obtain access to all of the connecting assemblies 215.

Since the compartment 216 will be partially or fully flooded, the diver will, of course, be provided with the usual diving gear, enabling him to operate in a submerged environment.

It will be realized that by providing a sheltered compartment 216 for the diver to operate in, particularly significant safety advantages are provided. The diver is thereby protected from direct contact with the ramp, latching assembly, and water turbulence. He is sheltered from hoisting equipment used to manipulate the hitch and ramp. Further, the realtively massive ramp and latch assemblies may undergo violent displacements due to sea action during assembly of the ramp and latching assembly with the vessel. Such displacements could be particularly hazardous to a diver positioned in the open sea at the stern of the vessel attempting to adjust these components. In addition, violent sea action acting on the person of the diver is avoided by positioning the diver within the flooded compartment inside the vessel.

On initial connection of the latching assembly 100 to the vessel assembly 200, it is necessary that the two assemblies be correctly transversely aligned with respect to each other. For this purpose, the aforementioned vertically extending left and right guide pockets 290 and 292 (FIG. 1), respectively, are provided.

The right guide pocket 292 includes a vertically and rearwardly extending side plate 294. This plate is fixedly secured to the rear stern wall 204 and is spaced portside of the adjacent right channel member 208.

Secured to the side wall 294 and extending perpendicularly to starboard is an end wall 296. Wall 296 is disposed in spaced parallel relation with the adjacent stern wall 204.

The right guide pocket 290 is of similar mirror-image construction in relation to guide pocket 290. However, instead of being secured to the rear end wall 204, guide pocket 290 is secured to an extension wall 300. The extension wall 300 is disposed in the plane of the stern wall 204 and extends to starboard of the side wall 202.

Reinforcement for the extension wall 300 is provided by a vertical tubular member 302 secured to and extending about the periphery of the extension wall 300. The member 302 is fixedly connected to the adjacent outer wall 211 of the left channel member 206. The tubular member 302 is further braced by a plurality of horizontal vertically spaced, forwardly extending tubular struts 304. The struts 304, at their forward ends, are secured to a vertically extending channel member 306 (FIG. 3). This channel member 306 is fixedly secured to the exterior of the side wall 202 of the vessel, generally adjacent the position occupied by the internal transverse bulkhead 217. Additional vertical and horizontal cross bracing 308 is provided between the struts 304 and the side wall 202 of the vessel. In addition, a plurality of triangular reinforcing gussets 310 (FIG. 1) is mounted between the end wall extension 300 and the side wall of the adjacent guide structure of the guide pocket 290.

At the upper ends of the pockets 290 and 292, the adjacent side and end wall members defining the pocket are flared outwardly to provide a mouth portion of increased cross sectional area. As the connecting assembly 100 is lowered downwardly, the body member portions 110(b) and 110(a) enter the flared mouth of the pockets 290 and 292. Continued downward motion causes the guide pockets 290 and 292 to centralize the latching assembly 100 with respect to the channel members 206 and 208 so that the tongues 102 and 104 are vertically aligned with the recesses 212 in the left and right channel members.

The openings 108 are generally aligned longitudinally with the openings 214 by the contact between notches 103 and the previously inserted base plungers 224(a). Thereafter, the remainder of the plungers 224 are moved into operating or extended position in the manner previously described, to secure the latching assembly 100 to the vessel.

The arrangement described above contemplates the use of divers to actuate the pins 224. This arrangement avoids the complexity and cost of a remote control system. However, in certain instances a remote control system, operable for example, from the deck of vessel 6, may be provided. Even with the use of a remote control system, compartment 216 provides unique protection for the operating component associated with the pins 224.

Ruggedized pontoon structure

FIGS. 12 to 15 illustrate an especially rugged modification of the upper end 500 of the buoyant ramp 4.

The modified ramp upper end 500 includes the reticulated grid network previously described, comprising longitudinally extending vertical plates 20, 24, 25, and 30, transverse vertical plates 26 and 28, and horizontal plate means 32. This modified upper end 500 further includes the two pontoons 12.

As in the case of the previously described embodiment, the pontoons 12, at their upper ends, include deflected portions defining a deflected upper end 501 of ramp 4. These deflected portions are deflected in the longitudinal vertical planes of the pontoons. Thus the upper ramp end 501 appears to be deflected downwardly relative to the main body portion, or lower portion, 502 of the pontoon 12. This deflection, as described in U.S. Hauber Pat. No. 3,280,571 positions the main body portion 502 such that the pipeline supporting rollers carried by the pontoon or ramp 4 will define a pipe supporting cradle property oriented in relation to the pipe supporting rollers carried on the ramp 222 of the floating vessel or barge 6.

The reticulated grid 503 previously described, and comprising plates 20, 24, 25, 26, 28, 30 and 32, extends generally longitudinally of the deflected upper end 501 of the ramp 4. This grid 503 thus provides a force transmitting network for transmitting force generally longitudinally between the pontoon 12 and the connecting bar 14 so as to, in essence, provide a network for transmitting force generally longitudinally between the ramp 4 and the vessel 6.

As shown in FIG. 14, each of the plates 20, 24 and 25 is extended downwardly. In each pontoon 12, the lower edges 20a, 24a and 25a of these plates are welded to plate means 504. Each such plate means 504 is disposed beneath the deflected pontoon portion 501 and is disposed in generally parallel relation to the generally horizontal and longitudinally extending median plane of the pontoon portion 501.

The U-shaped pontoon portion 12a bridge the deflection zone between ramp portions 501 and 502.

The forward end 505 of each generally U-shaped pontoon portion 12a is welded to the under surface of one of the two plate means 504. Force transmission between each plate means 504 and its associated forward ends 505 is further facilitated by a pair of mutually intersecting plate means 506 and 507. Plate means 506 and 507 intersect so as to define a generally X-shaped, gusset-like structure having an axis of intersection 508 generally aligned with the central axis of their associated portion 505. Each of the plate portions 506 and 507 is welded to the underside of a plate means 504, as well as to apertured or slotted portions of the cylindrical component 505 through which the plate means pass, such as the illustrated slot 509 associated with the plate means 506.

Lateral reinforcing between downwardly extended plate means 20, 24 and 25 is provided by transverse extending cradle-like plate means 510, 511, 512 and 513.

It is significant to note that the upper edges of plate means 510, 511, 512 and 513 are disposed in disconnected relation with respect to the under surface of the pontoons of deflected ramp portion 501. This ensures that force is transmitted from reinforcing means 12a directly into the grid network 503, rather than through the cylindrical wall portions 514 of the pontoons of the deflected ramp upper end 501. In this fashion the generally longitudinal transmission of force through the upper ramp end 501 is maintained.

Further ruggedizing of the upper end 500 of ramp 4 is effected by providing, between each pontoon 12 and its associated U-shaped reinforcing means 12a, a series of vertically extending, cylindrical column means 515, 516 and 517. Communicating relation between the pontoons 12 of uppermost buoyancy compartments in the main body portion 502 may be effected through the utilization of U-shaped buoyancy chamber connecting means 518, of the type generally described in the U.S. Lawrence Pat. 3,390,532.

A pair of horizontally displaced, but longitudinally and vertically extending, gusset plates 519 and 520 may be employed to structurally strengthen the welded connection between each outermost portion 521 of each reinforcing means 12a and a upper portion 522 of the main body 502 of the ramp 4. It is contemplated that the portions 521 will not intersect the cylindrical walls of the pontoons 12 of the ramp portion 522.

SUMMARY OF ADVANTAGES

It will be appreciated that in constructing a connecting assembly according to the present invention certain significant advantages are provided.

In particular, the protection afforded to the diver by the flooded compartment which surrounds the plungers for connecting the latching assembly to the ramp, provides important safety advantages. This structure enables the diver to connect the latching assembly to the vessel without being exposed to the action of the open sea directly upon the diver or without requiring him to be positioned where he might easily be injured by relative motion of the relatively massive ramp and latching member assemblies while they are being connected.

Also very important is the particularly rigid and rugged structure which prevents separation of the ramp from the vessel even under extremely violent weather conditions. In this connection the lateral support afforded to the tongue members by the channel members which extend directly into the vessel is noteworthy.

Also significant is the bar carrier structure for connecting the connector bar to the ramp in such a way as to diffuse the connector bar loads into the ramp structure without high local stress distributions which might otherwise cause failure. The network of perpendicularly intersecting webs and plates on both the ramp upper end assembly and the latching assembly is very valuable in providing particularly rugged connection.

The use of the articulately interconnected reticulated grid networks, disposed in and extending between the upper end of the buoyant ramp 4, the hitch assembly 100 and the stern end of the vessel 6, provides a particularly effective system for distributing stress. In difficult operating conditions, this stress distribution tends to prevent hitch failure.

The recessed nature of the connection between the hitch assembly and the stern of the vessel, forward of the stern bulkhead 204, enables the stern bulkhead to both protect and house this connection. This protection, in combination with the direct distribution of stress from the connection into the reticulated grid network of the vessel stern, affords an unusually rugged connection between the hitch assembly and the vessel.

By connecting the reinforcing means 12a to the grid 503 of the ruggedized ramp, a generally longitudinal transmission of force between the ramp 4 and the vessel 6 is maintained. This concept tends to avoid the imposition of transverse force on the ramp, in the vicinity of the hitch, which transverse force might tend to cause pontoon wall cracking or fracturing.

In describing the invention, reference has been made to a preferred embodiment. However, those skilled in the art and familiar with the disclosure of the invention may recognize additions, deletions, substitutions or other modifications which would fall within the purview of the invention as defined in the appended claims.

We claim:

1. A connecting assembly for connecting a longitudinally extending immersible ramp with a marine vessel floating on a body of water, the connecting assembly comprising
   connector means fixedly connected with the ramp;
   latching means releasably engageable with said connector means;
   releasable means for releasably connecting said latching means with the vessel, said releasable means including
      first engaging means connected with said latching means,
      second engaging means connectable with the vessel, said second engaging means actuatable by a diver positioned adjacent said second engaging means to releasably engage said first engaging means,
      a compartment mounted on the vessel in fluid communication with the body of water, said compartment surrounding said second engaging means to provide a water environment thereabout sheltered from the main body of water; and
      access means connected with said compartment adapted to permit the diver to enter and leave said compartment.

2. A connecting assembly as defined in claim 1:
   wherein said first engaging means further includes
      at least one vertically extending first member connected to said latching means, and
      a plurality of vertically spaced first openings extending transversely through said first member; and
   wherein said second engaging means further includes
      at least one vertically extending second member matingly engaging said first member to prevent relative transverse movement between said members when engaged and to enable relative vertical sliding motion between said members,
      a plurality of vertically spaced second openings extending transversely through said second member, certain of said second openings moving into registering alignment with certain of said first openings upon relative sliding motion of said first and second members, and
      a plurality of securing means selectively movable through aligned ones of said first and second openings for fixedly securing said first and second members together, said securing means being adapted to be moved to secure said members by the diver when the diver occupies said flooded compartment.

3. A connecting assembly as defined in claim 1:
   wherein said connector means further includes
      a transversely extending bar, and
      bar carrier means adapted to fixedly connect said bar with an upper end of the ramp; and
   wherein said latching means further includes
      a body member,
         first holding means connected with said body for releasably embracing said bar to support said bar in horizontal transversely extending disposition, said first holding means preventing separation of said bar from said body in longitudinal and vertical directions while enabling rotation of said bar about a horizontal transverse pivotal axis, and
         locating means connected with said body contacting said bar for preventing transverse motion thereof relative to said body.

4. A connecting assembly as defined in claim 3 wherein said holding means further includes
   at least two transversely spaced cradles fixedly connected with said body member extending a longitudinally therefrom toward the ramp, each said cradle having
      a vertically extending, upwardly open slot, said bar entering said slot and moving downwardly to a closed lower end thereof to be engaged between said body member and adjacent portions of said cradle;
   at least two transversely spaced latching arms disposed adjacent said cradles, each said latching arm being movably connected with said body; and
   motor means connected with said latching arms for moving said latching arms from an inoperative position out of said slots to an operative position subsequent to entry of said bar into said slots, said transverse arms in said operative position engaging the upper portions of said bar to prevent release of said bar from said slots.

5. A connecting assembly as defined in claim 4 further including
   at least two locking means each associated with each of said latching arms, said locking means movably connected with said body, each said locking means subsequent to motion of the associated said latching arm to the operative position thereof moving to a locking position between said latching arm and said body member to prevent returning motion of the associated said latching arm from the operative to the inoperative position thereof.

6. A connecting assembly as defined in claim 3 wherein said first engaging means further includes
   at least two transversely spaced, vertically extending first members;
   a plurality of vertically spaced first openings in each of said first members extending transversely thereof;
   and wherein said second engaging means also includes
   at least two transversely spaced, vertically extending second members, each said second members matingly engaging an adjacent one of said first members to prevent relative transverse motion between said members when engaged and to enable relative vertical sliding motion;
   a plurality of vertically spaced second openings in each of said second members extending transversely thereof, certain of said second openings moving into registering alignment with certain of said first openings upon relative vertical motion of said first and second members; and
   a plurality of securing means connected with said second members, said securing means being selectively movable through aligned ones of said first and second openings to fixedly secure the adjacent said first and second members together, said securing means being adapted to be moved into securing position by the diver when the diver occupies said flooded compartment.

7. A connecting assembly as defined in claim 7 wherein each said securing means includes
  a plunger aligned with an adjacent one of said second openings on a side of the associated said second member positioned internally of said flooded compartment;
  guide means connected with said second member contacting said plunger to guide said plunger for motion axially through said opening transversely outwardly of said flooded compartment; and
  reversible motor means adapted for selective operation by the diver, said reversible motor means connected with said plunger for motion of said plunger in an outward direction when the associated said second opening is in registry with one of said first openings, said plunger when extending through the aligned first and second openings preventing vertical and longitudinal sliding motion of the adjacent said first and second members.

8. A connecting assembly as defined in claim 3:
  wherein the ramp is further of the type including two generally horizontal, transversely spaced main tube members at the upper end of the ramp; and
  wherein said bar carrier means further includes
    at least two transversely spaced bar carrier assemblies fixedly connected with said bar, each said bar carrier assembly being positioned an adjacent associated one of the main tube members of the ramp, and
      each saw bar carrier assembly including at least two transversely spaced, vertically extending rigid webs adapted to extend axially into and be fixedly connected with the adjacent main tube member of said ramp to distribute loads imposed on said bar into the ramp at a stress concentration less than that likely to cause failure of the ramp.

9. A connecting assembly for connecting a longitudinally immersible ramp with a marine vessel floating on a body of water, the connecting assembly comprising
  connector means fixedly connected with the ramp;
  latching means releasably engageable with said connector means;
  releasable means for releasably connecting said latching means with the vessel, said releasable means including
    first engaging means connected with said latching means,
      second engaging means connectable with the vessel and releasably engageable with said first engaging means,
  a compartment mounted on the vessel in fluid communication with the body of water, said compartment surrounding said second engaging means to provide a water environment thereabout sheltered from the main body of water; and
  access means on said vessel and connected with said compartment, for providing diver access to said second engaging means.

10. In combination,
  a marine vessel adapted to float upon the surface of a body of water,
  a rigid ramp extending longitudinally away from said vessel downwardly into the water,
  connector means fixedly connected with an upper end of said ramp,
  latching means releasably engageable with said connector means,
  means for releasably connecting said latching means with said vessel, said means including
    first engaging means connected with said latching means,
    second engaging means connected with said vessel, said second engaging means adapted for selective actuation by a diver positioned adjacent said second engaging means to releasably engage said first engaging means,
  a compartment mounted on said vessel in fluid communication with the body of water, said compartment surrounding said second engaging means to provide a water environment thereabout sheltered from the main body of water, and
  access means connected with said compartment adapted to permit the diver to enter and leave said compartment.

11. A method of connecting a ramp latching assembly with a marine vessel floating on the surface of a body of water, the ramp being of the type utilized to provide underlying support for a pipeline being laid from the vessel to the bed of the body of water, the method comprising the steps of
  providing first engaging means on the latching assembly,
  providing second engaging means on the vessel with the second engaging means being adapted to be actuated by a diver positioned adjacent the second engaging means to releasably engage the first engaging means,
  providing a compartment on the vessel in fluid communication with the body of water to surround the second engaging means within a water environment sheltered from the main body of water;
  aligning the first and second engaging means; and
  admitting a diver to the sheltered body of water within the flooded compartment so that the diver may actuate the second engaging means to latchingly engage the first engaging means without being directly exposed to the environment external of the vessel.

12. An assembly for use in pipelaying operations comprising
  a bouyant ramp;
  a hitch assembly;
  a floating vessel;
  a first reticulated grid network extending generally longitudinally of said bouyant ramp;
  a second reticulated grid network extending generally longitudinally of said hitch assembly;
  a third reticulated grid network fixed to and extending generally longitudinally of said floating vessel;
  a first pin means interconnecting said first and second reticulated grid networks;
  second pin means interconnecting said second and third reticulated grid networks; and
  channel means mounting said second pin means forward of the stern of said floating vessel, said channel means being reinforced by said third reticulated grid network to distribute force transmitted to said channel means by said hitch assembly through said second pin means.

13. An assembly for use in laying pipelines offshore, said assembly comprising
  floating vessel means;
  bouyant ramp means;
  connecting means disposed between said bouyant ramp means and said floating vessel means;
  actuating means for said connecting means carried by and disposed within said floating vessel means;
  at least partially flooded compartment means disposed within said floating vessel means and including means providing diver access to said actuating means, said compartment means surrounding said actuating means to provide a water environment thereabout sheltered from the main body of water.

14. A ramp structure for bouyantly supporting a portion of a pipeline, said ramp structure comprising:
  a lower body means;
  upper body means vertically deflected relative to said lower body means;

23 generally U-shaped reinforcing means interconnecting said upper and lower body means;

connecting means operable to pivotally connect said deflected upper body means to floating vessel;

reticulated grid means extending longitudinally of said deflected body means and connected directly with said connecting means;

said generally U-shaped reinforcing means being directly connected with said reticulated grid means and said lower body means and operable to transmit force generally longitudinally of the ramp structure by transmission of force directly through said reticulated grip means to said connecting means.

24

References Cited

UNITED STATES PATENTS

| 2,337,138 | 12/1943 | Van Berg | 14—72 |
| 3,390,532 | 7/1968 | Lawrence | 61—72.3 |
| 3,431,739 | 3/1969 | Richardson et al. | 61—72.3 |

JACOB SHAPIRO, Primary Examiner

U.S. Cl. X.R.

61—69